(12) United States Patent
Qin et al.

(10) Patent No.: US 12,531,605 B2
(45) Date of Patent: Jan. 20, 2026

(54) INFORMATION TRANSMISSION METHOD AND APPARATUS

(71) Applicant: Huawei Technologies Co., Ltd., Shenzhen (CN)

(72) Inventors: Cheng Qin, Beijing (CN); Sihai Wang, Beijing (CN); Rui Yang, Beijing (CN); Xueru Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 18/392,198

(22) Filed: Dec. 21, 2023

(65) Prior Publication Data

US 2024/0120971 A1      Apr. 11, 2024

Related U.S. Application Data

(63) Continuation of application No. PCT/CN2022/086289, filed on Apr. 12, 2022.

(30) Foreign Application Priority Data

Jun. 22, 2021 (CN) .......................... 202110689714.8
Jul. 30, 2021 (CN) .......................... 202110868001.8

(51) Int. Cl.
  *H04B 7/02*  (2018.01)
  *H04B 7/0417*  (2017.01)
(52) U.S. Cl.
  CPC ................... *H04B 7/0417* (2013.01)
(58) Field of Classification Search
  CPC .................................................. H04B 7/0417

USPC ................. 375/267, 260, 259, 219, 295, 316
See application file for complete search history.

(56) References Cited

U.S. PATENT DOCUMENTS

2022/0239359 A1\* 7/2022 Pezeshki .............. H04B 7/0639
2023/0246695 A1\* 8/2023 Wang ................... H04B 7/0626
                                                              375/267

FOREIGN PATENT DOCUMENTS

CN      111953448 A    11/2020
WO      2021108940 A1   6/2021

OTHER PUBLICATIONS

C.K. Wen, et al., "Deep Learning for Massive MIMO CSI Feedback", IEEE Wireless Commun. Lett., vol. 7, No. 5, total 5 pages, Mar. 22, 2018.
T. Chen, et al., "A Novel Quantization Method for Deep Learning-Based Massive MIMO CSI Feedback", IEEE GlobalSIP 2019, Nov. 11-14, 2019, total 5 pages.

(Continued)

*Primary Examiner* — Zewdu A Kassa
(74) *Attorney, Agent, or Firm* — Slater Matsil, LLP

(57) ABSTRACT

This application provides an information transmission method and apparatus. The method includes: receiving first indication information from a network device, where the first indication information indicates an association relationship between a plurality of branch networks in an artificial intelligence AI network and channel state information CSI measurement configuration information; and obtaining first quantization information based on a first branch network and channel information, where the first branch network is associated with current CSI measurement configuration information, and the first branch network belongs to the plurality of branch networks in the AI network.

20 Claims, 8 Drawing Sheets

(56) References Cited

OTHER PUBLICATIONS

Q, Yang et al., "Deep Convolutional Compression for Massive MIMO CSI Feedback", IEEE International Workshop on Machine Learning for Signal Processing (MLSP 2019), Oct. 13-16, 2019, total 6 pages.

Mahdi Boloursaz Mashhadi et al, "Distributed Deep Convolutional Compression for Massive MIMO CSI Feedback," IEEE Transactions on Wireless Communications (vol. 20, No. 4, Apr. 2021), Dec. 16, 2020, total 13 pages.

* cited by examiner

INFORMATION TRANSMISSION METHOD AND APPARATUS

CROSS-REFERENCE TO RELATED APPLICATIONS

This application is a continuation of International Application No. PCT/CN2022/086289, filed on Apr. 12, 2022, which claims priority to Chinese Patent Application No. 202110689714.8, filed on Jun. 22, 2021 and Chinese Patent Application No. 202110868001.8, filed on Jul. 30, 2021. All of the aforementioned applications are hereby incorporated by reference in their entireties.

TECHNICAL FIELD

This application relates to the communication field, and more specifically, to an information transmission method and apparatus.

BACKGROUND

In a communication system, a network device (for example, a base station) needs to obtain downlink channel information fed back by a terminal device, to perform processing, for example, precoding, on downlink data. In a current feedback mechanism, the terminal device compresses the channel information in spatial domain or frequency domain, for example, projects the channel information onto a discrete Fourier transform (DFT) substrate of the spatial domain or the frequency domain. Channel information that is of an original channel and that is in spatial domain and frequency domain is described based on a projection result.

However, in this feedback manner, a fixed projection coordinate system is used, information precision is lost, and an amount of needed feedback information increases as a spatial-domain dimension, a frequency-domain dimension, and measurement-required precision increase.

Therefore, an information transmission method is needed urgently, to increase feedback information precision and reduce overheads.

SUMMARY

This application provides an information transmission method and apparatus. An AI network architecture in a reuse form can meet different measurement configurations or feedback reporting configuration requirements. This helps increase feedback information precision and reduce overheads.

According to a first aspect, an information transmission method is provided, including: receiving first indication information from a network device, where the first indication information indicates an association relationship between a plurality of branch networks in an artificial intelligence AI network and channel state information CSI measurement configuration information; and obtaining first quantization information based on a first branch network and channel information, where the first branch network is associated with current CSI measurement configuration information, and the first branch network belongs to the plurality of branch networks in the AI network.

"Based on a first branch network and channel information" may also be expressed as processing the channel information based on the first branch network, or inputting the channel information into the first branch network. This is not limited in this application.

According to the technical solutions of this application, different measurement configurations or feedback reporting configuration requirements can be met by using an AI network architecture in a reuse form. This helps increase feedback information precision and reduce feedback overheads.

With reference to the first aspect, in some implementations of the first aspect, the obtaining first quantization information based on a first branch network and channel information includes: obtaining a first matrix based on the first branch network and the channel information; and obtaining the first quantization information based on a first quantization network and the first matrix, where the first quantization network is associated with the current CSI measurement configuration information and/or the first branch network.

In this application, the first indication information may indicate an association relationship between a plurality of quantization networks in the AI network and the channel state information CSI measurement configuration information, to indicate that the first quantization network is associated with the current CSI measurement configuration information and/or the first branch network.

According to the technical solutions of this application, the quantization network in the AI network is obtained through training. The first matrix is quantized based on the quantization network, to obtain quantization information. The quantization information is sent to the network device, to further reduce the feedback overheads.

With reference to the first aspect, in some implementations of the first aspect, the first indication information further indicates a quantization manner. The quantization manner includes at least a quantization direction or a quantization dimension. The obtaining the first quantization information based on a first quantization network and the first matrix includes: processing the first matrix based on the first quantization network in the quantization manner, to obtain the first quantization information.

According to the technical solutions of this application, the quantization manner used by the quantization network is indicated, so that the feedback overheads can be reduced, and different measurement configurations or feedback reporting configuration requirements, for example, different feedback capacity requirements or feedback precision requirements can be met.

With reference to the first aspect, in some implementations of the first aspect, the first quantization information includes second quantization information and third quantization information. The obtaining the first quantization information based on a first quantization network and the first matrix includes: dividing the first matrix into a second matrix and a third matrix in the quantization manner; and obtaining the second quantization information based on the first quantization network and the second matrix, and obtaining the third quantization information based on a second quantization network and the third matrix. The second quantization network is associated with the current CSI measurement configuration information and/or the first branch network.

According to the technical solution of this application, the first matrix is divided into a plurality of matrices for separate quantization, so that the AI network can perform parallel processing on the channel information, to increase an information processing speed and reduce a communication delay.

Optionally, the AI network may further include a fully connected layer. After processing at the fully connected layer, the first matrix is a first vector. Further, the first vector may be divided into a plurality of vectors for separate quantization. In this way, complexity of high-dimensional space quantization can be avoided. This helps implement a small quantity of bits of feedback, increase the feedback information precision, and reduce the feedback overheads.

With reference to the first aspect, in some implementations of the first aspect, obtaining the first quantization information based on a first quantization network and the first matrix includes: obtaining a fourth matrix based on a second branch network and the first matrix, where the second branch network is associated with the current CSI measurement configuration information, and the second branch network belongs to the plurality of branch networks in the AI network; and obtaining the first quantization information based on the fourth matrix.

Specifically, the obtaining the first quantization information based on the fourth matrix includes: obtaining the first quantization information based on a third quantization network and the fourth matrix, where the third quantization network is associated with the current CSI measurement configuration information and/or the second branch network.

Optionally, the first quantization information may further include both a quantization result of the fourth matrix and a quantization result of the first matrix.

With reference to the first aspect, in some implementations of the first aspect, the method further includes: sending the first quantization information to the network device.

Specifically, the sending the first quantization information to the network device includes: sending the first quantization information to the network device in a preconfigured sequence.

The preconfigured sequence includes at least one of the following: a line before column sequence, a column before line sequence, or a sequence of identifiers IDs of the branch networks.

According to a second aspect, an information transmission method is provided, including: sending first indication information to a terminal device, where the first indication information indicates an association relationship between a plurality of branch networks in an artificial intelligence AI network and channel state information CSI measurement configuration information; and receiving first quantization information from the terminal device, where the first quantization information is obtained based on a first branch network and channel information, the first branch network is associated with current CSI measurement configuration information, and the first branch network belongs to the plurality of branch networks in the AI network.

According to the technical solutions of this application, different measurement configurations or feedback reporting configuration requirements can be met by using a network architecture in a reuse form. This helps increase feedback information precision and reduce feedback overheads.

With reference to the second aspect, in some implementations of the second aspect, the first quantization information is obtained based on a first quantization network and a first matrix. The first matrix is obtained based on the first branch network and the channel information. The first quantization network is associated with the current CSI measurement configuration information and/or the first branch network.

In this application, the first indication information may indicate an association relationship between a plurality of quantization networks in the AI network and the channel state information CSI measurement configuration information, to indicate that the first quantization network is associated with the current CSI measurement configuration information and/or the first branch network.

According to the technical solutions of this application, the quantization network in the AI network is obtained through training. The terminal device quantizes the first matrix based on the quantization network, to obtain quantization information, and sends the quantization information to a network device, to further reduce the feedback overheads.

With reference to the second aspect, in some implementations of the second aspect, the first indication information further indicates a quantization manner. The quantization manner includes at least a quantization direction or a quantization dimension. The first quantization information is obtained based on the first quantization network, the quantization manner, and the first matrix.

According to the technical solutions of this application, the quantization manner used by the quantization network is indicated, so that the feedback overheads can be reduced, and different measurement configurations or feedback reporting configuration requirements, for example, different feedback capacity requirements or feedback precision requirements can be met.

With reference to the second aspect, in some implementations of the second aspect, the first quantization information includes second quantization information and third quantization information. The second quantization information is obtained based on the first quantization network and a second matrix. The third quantization information is obtained based on a second quantization network and a third matrix. The second matrix and the third matrix are combined to form the first matrix. The second quantization network is associated with the current CSI measurement configuration information and/or the first branch network.

According to the technical solution of this application, the first matrix is divided into a plurality of matrices for separate quantization, so that the AI network can perform parallel processing on the channel information, to increase an information processing speed and reduce a communication delay.

Optionally, the AI network may further include a fully connected layer. After processing at the fully connected layer, the first matrix is a first vector. Further, the first vector may be divided into a plurality of vectors for separate quantization. In this way, complexity of high-dimensional space quantization can be avoided. This helps implement a small quantity of bits of feedback, increase the feedback information precision, and reduce the feedback overheads.

With reference to the second aspect, in some implementations of the second aspect, the first quantization information is obtained based on a fourth matrix. The fourth matrix is obtained based on a second branch network and the first matrix. The second branch network is associated with the current CSI measurement configuration information. The second branch network belongs to the plurality of branch networks in the AI network.

Specifically, the first quantization information is obtained based on a third quantization network and the fourth matrix. The third quantization network is associated with the current CSI measurement configuration information and/or the second branch network.

Optionally, the first quantization information may further include both a quantization result of the fourth matrix and a quantization result of the first matrix.

With reference to the second aspect, in some implementations of the second aspect, the receiving first quantization information from the terminal device includes: receiving the first quantization information from the terminal device in a preconfigured sequence.

The preconfigured sequence includes at least one of the following: a line before column sequence, a column before line sequence, or a sequence of identifiers IDs of the branch networks.

According to a third aspect, an information transmission apparatus is provided, including: A transceiver unit is configured to receive first indication information from a network device. The first indication information indicates an association relationship between a plurality of branch networks in an artificial intelligence AI network and channel state information CSI measurement configuration information. A processing unit is configured to obtain first quantization information based on a first branch network and channel information. The first branch network is associated with current CSI measurement configuration information. The first branch network belongs to the plurality of branch networks in the AI network.

With reference to the third aspect, in some implementations of the third aspect, the processing unit is specifically configured to: obtain a first matrix based on the first branch network and the channel information; and obtain the first quantization information based on a first quantization network and the first matrix. The first quantization network is associated with the current CSI measurement configuration information and/or the first branch network.

With reference to the third aspect, in some implementations of the third aspect, the first indication information further indicates a quantization manner. The quantization manner includes at least a quantization direction or a quantization dimension. The processing unit is specifically configured to process the first matrix based on the first quantization network in the quantization manner, to obtain the first quantization information.

With reference to the third aspect, in some implementations of the third aspect, the first quantization information includes second quantization information and third quantization information. The processing unit is specifically configured to: divide the first matrix into a second matrix and a third matrix in the quantization manner; and obtain the second quantization information based on the first quantization network and the second matrix, and obtain the third quantization information based on a second quantization network and the third matrix. The second quantization network is associated with the current CSI measurement configuration information and/or the first branch network.

With reference to the third aspect, in some implementations of the third aspect, the first quantization information is obtained based on the first quantization network and the first matrix. The processing unit is specifically configured to: obtain a fourth matrix based on a second branch network and the first matrix, where the second branch network is associated with the current CSI measurement configuration information, and the second branch network belongs to the plurality of branch networks in the AI network; and obtain the first quantization information based on the fourth matrix.

With reference to the third aspect, in some implementations of the third aspect, the processing unit is specifically configured to obtain the first quantization information based on a third quantization network and the fourth matrix. The third quantization network is associated with the current CSI measurement configuration information and/or the second branch network.

Specifically, the transceiver unit is further configured to send the first quantization information to the network device.

With reference to the third aspect, in some implementations of the third aspect, the transceiver unit is specifically configured to send the first quantization information to the network device in a preconfigured sequence.

With reference to the third aspect, in some implementations of the third aspect, the preconfigured sequence includes at least one of the following: a line before column sequence, a column before line sequence, or a sequence of identifiers IDs of the branch networks.

According to a fourth aspect, an information transmission apparatus is provided, including: A transceiver unit is configured to send first indication information to a terminal device. The first indication information indicates an association relationship between a plurality of branch networks in an artificial intelligence AI network and channel state information CSI measurement configuration information. The transceiver unit is further configured to receive first quantization information from the terminal device. The first quantization information is obtained based on a first branch network and channel information. The first branch network is associated with current CSI measurement configuration information. The first branch network belongs to the plurality of branch networks in the AI network.

With reference to the fourth aspect, in some implementations of the fourth aspect, the first quantization information is obtained based on a first quantization network and a first matrix. The first matrix is obtained based on the first branch network and the channel information. The first quantization network is associated with the current CSI measurement configuration information and/or the first branch network.

In this application, the first indication information may indicate an association relationship between a plurality of quantization networks in the AI network and the channel state information CSI measurement configuration information, to indicate that the first quantization network is associated with the current CSI measurement configuration information and/or the first branch network.

With reference to the fourth aspect, in some implementations of the fourth aspect, the first indication information further indicates a quantization manner. The quantization manner includes at least a quantization direction or a quantization dimension. The first quantization information is obtained based on the first quantization network, the quantization manner, and the first matrix.

With reference to the fourth aspect, in some implementations of the fourth aspect, the first quantization information includes second quantization information and third quantization information. The second quantization information is obtained based on the first quantization network and a second matrix. The third quantization information is obtained based on a second quantization network and a third matrix. The second matrix and the third matrix are combined to form the first matrix. The second quantization network is associated with the current CSI measurement configuration information and/or the first branch network.

Optionally, the AI network may further include a fully connected layer. After processing at the fully connected layer, the first matrix is a first vector. Further, the first vector may be divided into a plurality of vectors for separate quantization. In this way, complexity of high-dimensional space quantization can be avoided. This helps implement a small quantity of bits of feedback, increase the feedback information precision, and reduce the feedback overheads.

With reference to the fourth aspect, in some implementations of the fourth aspect, the first quantization information is obtained based on a fourth matrix. The fourth matrix is obtained based on a second branch network and the first matrix. The second branch network is associated with the current CSI measurement configuration information. The second branch network belongs to the plurality of branch networks in the AI network.

Specifically, the first quantization information is obtained based on a third quantization network and the fourth matrix. The third quantization network is associated with the current CSI measurement configuration information and/or the second branch network.

With reference to the fourth aspect, in some implementations of the fourth aspect, the transceiver unit is specifically configured to receive the first quantization information from the terminal device in a preconfigured sequence.

The preconfigured sequence includes at least one of the following: a line before column sequence, a column before line sequence, or a sequence of identifiers IDs of the branch networks.

According to a fifth aspect, a communication apparatus is provided, and includes a processor. The processor is coupled to a memory. The memory is configured to store a program or instructions. When the program or the instructions are executed by the processor, the apparatus is enabled to implement the method in any one of the first aspect, the second aspect, the implementations of the first aspect, and the implementations of the second aspect.

Optionally, there are one or more processors, and there are one or more memories.

Optionally, the memory and the processor may be integrated together, or the memory and the processor are separately disposed.

According to a sixth aspect, a communication system is provided, and includes a terminal device and a network device.

The terminal device is configured to implement the method in each implementation of the first aspect, and the network device is configured to implement the method in each implementation of the second aspect.

In a possible design, the communication system further includes another device that interacts with the terminal device in the solutions provided in embodiments of this application.

According to a seventh aspect, a computer program product is provided. The computer program product includes a computer program or instructions. When the computer program or the instructions are run on a computer, the computer is enabled to perform the method in the foregoing aspects.

It should be noted that all or some of the computer program or the instructions may be stored in a first storage medium. The first storage medium may be packaged together with a processor, or may be packaged separately from a processor. This is not specifically limited in embodiments of this application.

According to an eighth aspect, a computer-readable medium is provided. The computer-readable medium stores a computer program or instructions. When the computer program or the instructions are run on a computer, the computer is enabled to perform the method in the foregoing aspects.

According to a ninth aspect, a chip system is provided, and includes a memory and a processor. The memory is configured to store a computer program, and the processor is configured to invoke and run the computer program from the memory, to enable a communication device in which the chip system is installed to perform the method in any one of the first aspect, the second aspect, the implementations of the first aspect, and the implementations of the second aspect.

The chip system may include an input chip or interface configured to send information or data, and an output chip or interface configured to receive information or data.

DESCRIPTION OF EMBODIMENTS

The following describes the technical solutions of this application with reference to the accompanying drawings.

Figure 1:
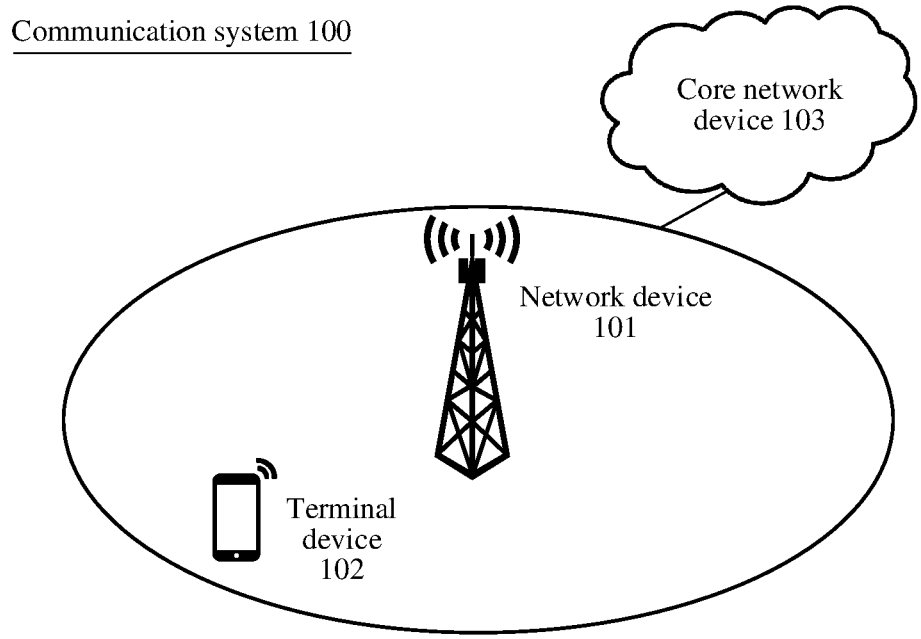
FIG. 1 is a schematic diagram of a communication system to which this application is applicable.

FIG. 1 is a schematic diagram of a communication system 100 to which an embodiment of this application is applicable.

As shown in FIG. 1, the communication system 100 may include a network device 101 and a terminal device 102, and optionally, may further include a core network device 103. The network device 101 can communicate with the core network device 103, and the terminal device 102 can communicate with the network device 101.

The terminal device in this embodiment of this application may also be referred to as user equipment, an access terminal, a subscriber unit, a subscriber station, a mobile station, a remote station, a remote terminal, a mobile device, a user terminal, a wireless communication device, a user agent, a user apparatus, or the like. The terminal device in this embodiment of this application may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, a terminal in a future evolved network, or the like.

The wearable device may also be referred to as a wearable smart device, and is a general term of wearable devices, for example, glasses, gloves, watches, clothes, and shoes, that are developed by applying wearable technologies to intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generic wearable smart devices include full-featured and large-size devices that can implement complete or partial functions without depending on smartphones, for example, smart watches or smart glasses, and devices that focus only on a type of application function and need to work with other devices such as smartphones, for example, various smart bands or smart jewelry for monitoring physical symptoms.

In addition, the terminal device may alternatively be a terminal device in an internet of things (IoT) system. A technical feature of the IoT is to connect an object to a network by using a communication technology, to implement an intelligent network of human-machine interconnection and thing-thing interconnection. A specific form of the terminal device is not limited in this application.

It should be understood that in this embodiment of this application, the terminal device may be an apparatus configured to implement a function of the terminal device, or may be an apparatus, for example, a chip system, that can support the terminal device in implementing the function. The apparatus may be installed in the terminal. In this embodiment of this application, the chip system may include a chip, or may include a chip and another discrete component.

The network device in this embodiment of this application may be any device having a wireless transceiver function. The device includes but is not limited to an evolved NodeB (eNB), a home NodeB (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP) or a transmission reception point (TRP), or the like, or may be a next generation NodeB (gNB) in a 5th generation (5G), for example, a new radio (NR) wireless communication system, a transmission point (TRP or TP), one or a group of (including a plurality of antenna panels) antenna panels of a base station in a 5G system, or may be a network node, for example, a baseband unit (BBU) or a distributed unit (DU), that forms a gNB or a transmission point.

In some deployments, the gNB may include a central unit (CU) and the DU. The CU performs some functions of the gNB, and the DU performs some functions of the gNB. For example, the CU is responsible for processing a non-real-time protocol and service, and implements functions of radio resource control (RRC) and a packet data convergence protocol (PDCP) layer. The DU is responsible for processing a physical layer protocol and a real-time service, and implements functions of a radio link control (RLC) layer, a media access control (MAC) layer, and a physical (PHY) layer. The gNB may further include an active antenna unit (AAU). The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling, for example, RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (core network, CN). This is not limited in this application.

It should be understood that in this embodiment of this application, the network device may be an apparatus configured to implement a function of the network device, or may be an apparatus, for example, a chip system, that can support the network device in implementing the function. The apparatus may be installed in the network device.

The technical solutions in embodiments of this application may be applied to various communication systems, for example, an LTE frequency division duplex (FDD) system, LTE time division duplex (TDD), a 5G system, vehicle-to-X (V2X), where the V2X may include vehicle to network (V2N), vehicle to vehicle (V2V), vehicle to infrastructure (V2I), a vehicle to pedestrian (V2P), and the like, long term evolution-vehicle (LTE-V), vehicle-to-everything, machine type communication (MTC), an internet of things (IoT), long term evolution-machine (LTE-M), machine to machine (M2M), device to device (D2D), or a future evolved communication system, for example, a 6th generation (6G) system.

Because embodiments of this application relate to massive application of a neural network, for ease of understanding, the following describes terms and concepts related to the neural network that may be used in embodiments of this application.

(1) Neural Network

The neural network may include a neural unit. The neural unit may be an operation unit with xs as an input. An output of the operation unit may be as follows:

$$h_{w,b}(x)=f(w^T x)=f(\Sigma_{s=1}^{n} W_s x_s + b) \quad (1\text{-}1).$$

s=1, n, n is a natural number greater than 1, Ws is a weight of xs, b is a bias of the neural unit, and corresponds to an intercept 1 that is input.

f is an activation function of the neural unit, and is used for introducing a non-linear feature into the neural network, to convert an input signal in the neural unit into an output signal. The output signal of the activation function may serve as an input of a next layer. For example, the activation function may be a rectified linear function (ReLU), a hyperbolic tangent function tanh, or a sigmoid function.

The neural network is a network formed by connecting a plurality of single neural units together. To be specific, an output of a neural unit may be an input of another neural unit. An input of each neural unit may be connected to a local receptive field of a previous layer to extract a feature of the local receptive field. The local receptive field may be a region including several neural units.

(2) Deep Neural Network

The deep neural network (DNN), also referred to as a multi-layer neural network, may be understood as a neural network having a plurality of hidden layers. The DNN is divided based on locations of different layers. The neural network in the DNN may be divided into three types: an input layer, a hidden layer, and an output layer. Usually, a first layer is the input layer, the last layer is the output layer, and a middle layer is the hidden layer. Layers are fully connected, to be specific, any neuron in the ith layer is definitely connected to any (or each) neuron in the $(i+1)^{th}$ layer.

Although the DNN seems complex, it is not complex in terms of work at each layer. Simply speaking, the DNN is the following linear relationship expression: $\vec{y} = \alpha(W\vec{x} + \vec{b})$ where $\vec{x}$ is an input vector, $\vec{y}$ is an output vector, $\vec{b}$ is a bias vector, W is a weight matrix (which is also referred to as a coefficient), and $\alpha()$ is an activation function. At each layer, the output vector is obtained by performing such a simple operation on the input vector $\vec{x}$. Due to a large quantity of DNN layers, quantities of coefficients W and bias vectors $\vec{b}$ are also large. Definitions of these parameters in the DNN are as follows. The coefficient W is used as an example. It is assumed that in a DNN having three layers, a linear coefficient from the fourth neuron at the second layer to the second neuron at the third layer is defined as $W_{24}^3$. The superscript 3 indicates that a layer number in which the coefficient W is located is the third layer, and the subscript corresponds to a third layer index 2 that is output and a second layer index 4 that is input. In conclusion, a coefficient from the $k^{th}$ neuron of the $(L-1)^{th}$ layer to the $j^{th}$ neuron of the Lth layer is defined as $W_{jk}^L$.

It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. A process of training the deep neural network is a process of learning the weight matrix. A final objective of training is to obtain weight matrices (weight matrices formed by vectors W at many layers) of all layers of the trained deep neural network.

(3) Convolutional Neural Network

The convolutional neural network (CNN) is a deep neural network with a convolutional structure. The convolutional neural network includes a feature extractor that includes a convolutional layer and a sub-sampling layer. The feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes. Each feature plane may include some neural units that are in a rectangular arrangement. Neural units at a same feature plane share a weight, and the weight shared herein is a convolution kernel. Sharing the weight may be understood as that a channel information extraction manner is irrelevant to a location. The convolution kernel may be formalized in a matrix of a random size. In a training process of the convolutional neural network, an appropriate weight may be obtained for the convolution kernel through learning. In addition, benefits directly brought by sharing the weight are that connections among layers of the convolutional neural network are reduced, and an overfitting risk is reduced.

Currently, in a wireless communication system, the network device (for example, a base station) needs to obtain downlink channel information fed back by the terminal device, to precode data in a downlink direction and determine a modulation and coding scheme (MCS). In the TDD system, based on channel reciprocity, the downlink channel information may be obtained on a base station side via a sounding reference signal (SRS). In the FDD system, the information needs to be obtained through measurement and feedback of the UE. Information of channel state information (CSI) includes a precoding matrix indicator (PMI), a rank indicator (RI), a channel quality indicator (CQI), a layer 1-reference signal received power (IA-RSRP), and another parameter, and is used for describing the downlink channel information.

A CSI feedback mechanism of NR R15 is used as an example. A CSI-feedback-related configuration includes a measurement resource configuration and a reporting configuration. The measurement configuration mainly refers to a configuration of a related measurement resource, for example, a quantity of antenna ports, a periodicity, and a time-frequency domain location of a channel state information reference signal (CSI-RS) resource. The reporting configuration refers to a CSI-reporting-related configuration, for example, reporting content (for example, PMI/RI), a reporting periodicity, and a codebook type based on which reporting is performed. Each CSI measurement resource configuration and each reporting configuration are combined into one CSI measurement configuration. When the network device (for example, the base station) indicates the terminal device to use a specific CSI measurement configuration, the terminal device measures a measurement resource in the measurement configuration, and reports the CSI based on a reporting configuration in the measurement configuration.

Two CSI reporting feedback modes: a type I and a type II are specified in R15, and are specific used modes indicated by the network device (for example, the base station) to the terminal device in an RRC configuration. The terminal device estimates current channel information (which is usually a two-dimensional spatial-frequency domain complex number matrix) by measuring a CSI-RS signal. A current feedback mechanism is performed based on a codebook. Different quantities of CSI-RS antenna ports and different space ranks have different codeword ranges.

However, in the type I, information only about one codeword is fed back, and feedback precision is excessively low. In the type II, a plurality of codewords may be fed back, in other words, a linear combination of a plurality of codewords is used for describing a channel. Therefore, compared with the feedback of the type I, the feedback of the type II has higher precision, but brings more feedback overheads.

Currently, artificial intelligence (AI) technologies, for example, deep learning, have been widely used in applications, for example, image processing and speech recognition. For example, in image processing, a plurality of local features of an image may be extracted and matched by using the CNN network, to form descriptions of an advanced feature of the image, and used for image classification, compression, and the like. Combination of the AI technology and a wireless air interface technology is also one of research directions of current wireless communication. For example, in related research on combining the CSI feedback with the AI technology, based on an autoencoder structure, the terminal device may input a measured channel into an encoding network, and compress the measured channel into an encoding vector. A network device side may restore an original channel based on the compression vector by using a decoding network adapted to the compression vector.

The CSI feedback based on the autoencoder is used as an example. The autoencoder is a general name of a type of AI network structure, and usually includes two parts: an encoder and a decoder. A trained encoder and a trained decoder are respectively located on a terminal device side and the network device (for example, the base station) side. On the terminal device side, to obtain a channel characteristic with a sparse structure, first, a two-dimensional frequency-spatial domain channel that is input is converted into a two-dimensional delay-angular domain channel, and then a truncated delay-angular domain channel serves as an input of an AI network. After a channel matrix is input to an encoding network on the terminal device side, one vector is obtained. The vector further serves as an input of a decoder side on the network device (for example, the base station) side. After the vector passes through the decoder, a two-dimensional delay-angular domain matrix is obtained. The two-dimensional delay-angular domain matrix is further converted into a frequency-spatial domain channel through inverse conversion, to complete channel information restoration.

However, this technology does not consider a problem of quantization of a vector encoded by the encoder, in other words, it is assumed that the vector compressed by the terminal device may be perfectly fed back to the network device (for example, the base station). Each dimension of data of the vector is represented by a floating point number. A large quantity of bits are needed according to a floating point representation method, and in an actual system, the large quantity of bits usually cannot be communicated through an air interface. In addition, in this technology, the AI network uses a fully connected (FC) layer. As a result, a size that is input and a size that is output of the AI network are fixed, and the AI network cannot be applicable to a variable quantity of CSI-RS ports, and usage is inflexible.

In view of the foregoing problem, a scalar quantization manner is proposed in the industry to quantize each dimension of the output vector. Currently, mainstream scalar quantization manners include equal-length quantization and unequal-length quantization. The equal-length quantization is that each dimension is quantized in a uniform quantization manner. The unequal-length quantization, for example, entropy encoding quantization, is to first perform a rounding operation on each dimension of a floating point output to obtain a series of discrete values. Then, based on distribution of all dimensions of discrete values, coding schemes of different discrete values are obtained.

However, the scalar quantization manner usually has a discontinuous operation, for example, rounding, so that training of the entire AI network is unfeasible. As a result, a quantization process cannot be integrated into a training process of the autoencoder, and some information redundancy may also exist.

In view of this, this application provides an information transmission method, to expect to meet different measurement configurations or feedback reporting configuration requirements, to increase feedback information precision, and to reduce overheads.

Figure 2:
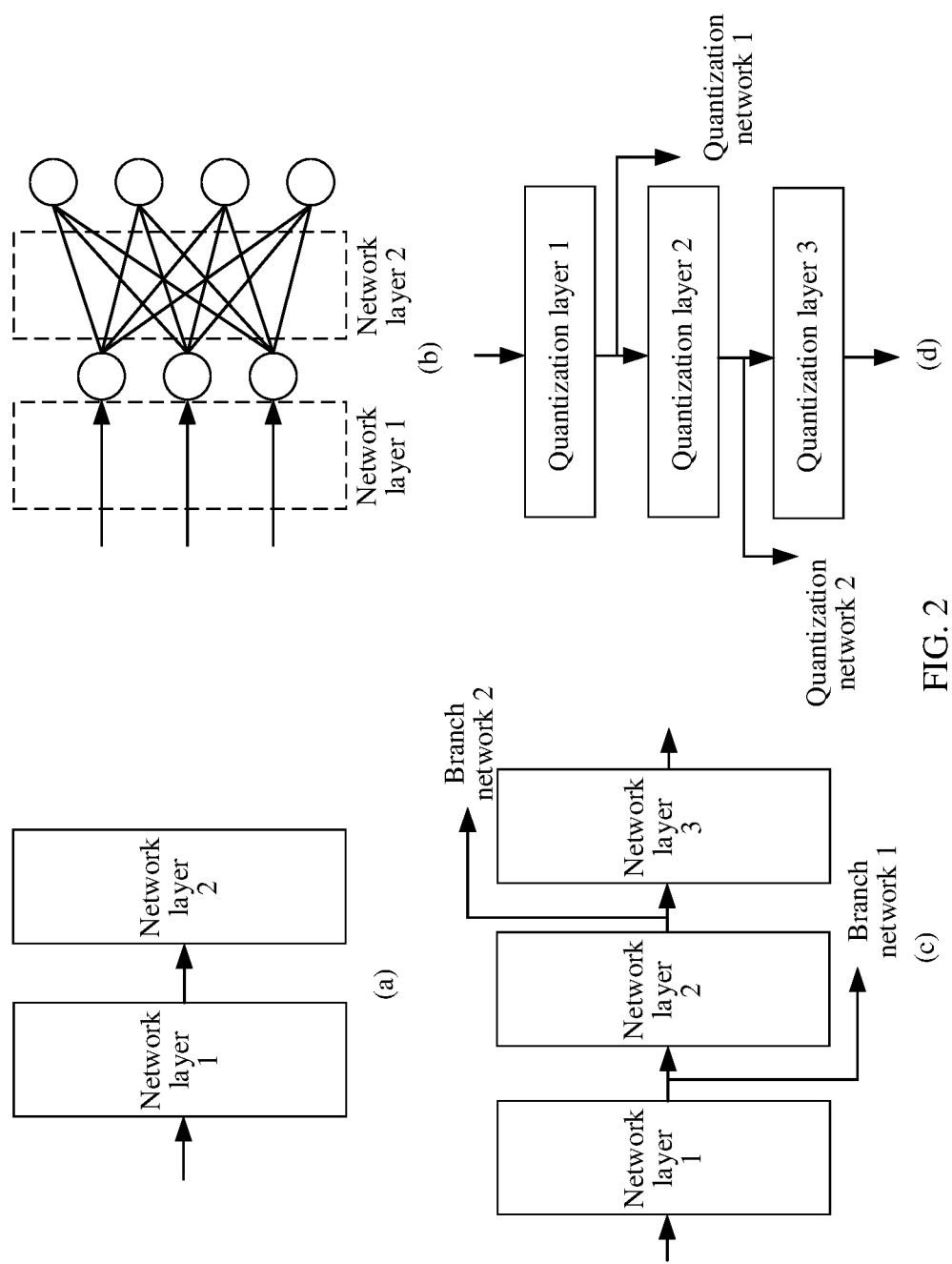
FIG. 2 is a schematic diagram of an AI network to which this application is applicable.

FIG. 2 is a schematic diagram of a structure of a simple neural network 200 to which this application is applicable.

In this application, (a) in FIG. 2 may be used for describing a logical relationship of a neural network, for example, a neural network including two network layers. In some scenarios, (a) in FIG. 2 may also be expressed as a three-layer neural network, to be specific, an output of a network layer 2 may also be separately expressed as a neural network layer. This is not limited in this application.

(b) in FIG. 2 is a detailed expanded diagram of (a) in FIG. 2. A network layer 1 is in a one-to-one mapping relationship, to be specific, all elements that are input are mapped to output neurons of the network layer 1 one by one. For example, if a three-dimensional column vector is input, the network layer 1 maps a vector and that is in each dimension to three output neurons of the layer one by one. The network layer 2 is a fully connected layer. It is assumed that there are four output neurons of the network layer 2. Without biasing, the network layer 2 includes 12 weights. The four output neurons of the network layer 2 may be obtained by performing a linear multiplication operation on the output of the network layer 1, and adding a non-linear activation operation.

Usually, to achieve a better effect, the neural network may generally include numerous network layers or numerous subnetworks, for example, a deep learning network. As shown in (c) in FIG. 2, different network layers are sequentially connected to form an AI network. A plurality of network layers sequentially operate an input of the network, to obtain an output of the network. In this application, a branch network may be led out from an intermediate network layer, and serves as the output of the network. For example, a branch network 1 is operated by the network layer 1, and a branch network 2 is operated by the network layer 1 and the network layer 2.

In this application, a quantization network has parameters and structures that may be reused. For example, as shown in (d) in FIG. 2, for different measurement resource configurations or branch networks, different quantization layers are associated, to form a plurality of quantization networks. For example, when a quantity of CSI-RS antenna ports in a measurement configuration is small, a quantization network with a low quantization dimension is associated; or when a requirement on feedback precision in a measurement configuration is high, a quantization network with a high quantization dimension is associated. For example, a quantization network 1 is operated by a quantization layer 1, and a quantization network 2 is operated by the quantization layer 1 and a quantization layer 2.

Figure 3:
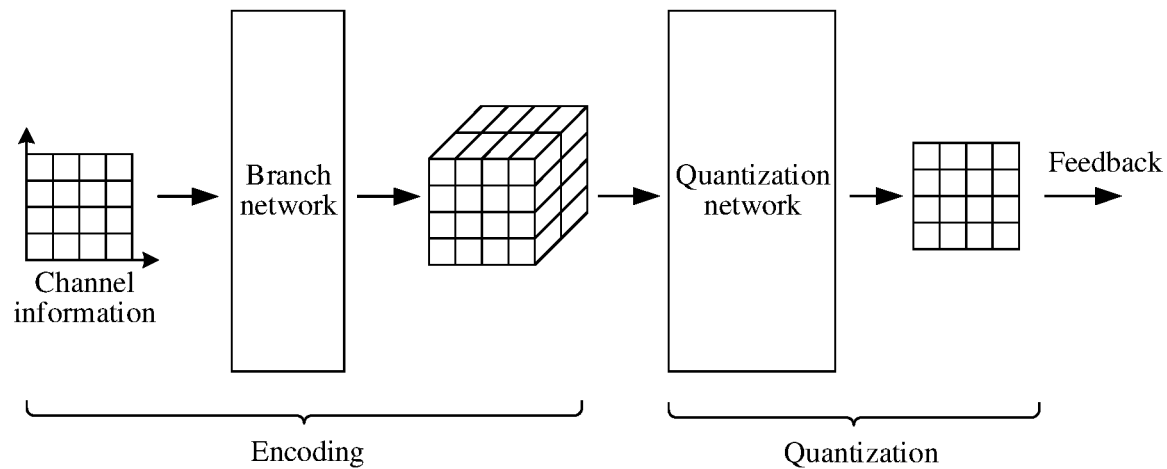
FIG. 3 is a schematic diagram of a logical structure of an AI network to which this application is applicable.

FIG. 3 is a schematic diagram of a logical structure of a neural network to which this application is applicable.

In this application, the neural network includes two functions. First, AI encoding is performed on channel information. Specifically, the channel information may be compressed, and coded into one or more vectors/matrices (real numbers). Then, a result obtained through AI encoding needs to be quantized. Specifically, after the result obtained through AI encoding passes through a quantization layer, one or more quantization indexes are obtained, to implement discretization representation of feedback information, and then the feedback information is fed back to a network device (for example, a base station). It should be noted that in this application, a quantization network is obtained through AI training.

Currently, a quantization manner may specifically include a quantization dimension, a quantization direction, and the like. In this application, the quantization manner is defined as performing quantization for a specific dimension and a specific dimension range for a vector that is output or a matrix that is output through AI encoding. For example, a three-dimensional matrix is output through AI encoding, and three dimensions are represented as [H, W, D]. For example, in image processing, H, W, and D may respectively represent a length, a width, and a depth of an image. For another example, in this application, H, W, and D may respectively represent an angular domain, a delay domain, and a feature domain of a channel. The quantization direction refers to quantization for one or more dimensions of the H dimension, the W dimension, and the D dimension. The quantization dimension means that, for example, when the quantization direction is the H dimension, the length is 32; when the quantization dimension is 32, quantization is performed on a vector of 1*32; or when the quantization dimension is 16, quantization is performed on a vector of 1*16.

In actual AI network configuration on a UE side, a configuration may not be displayed and an AI encoding layer network may not be distinguished from a quantization layer network, but an AI network is configured as a whole, for example, the three-layer AI network in (c) in FIG. 2. The network layer 1 and the network layer 2 may perform an AI encoding function, and the network layer 3 may perform a quantization layer function.

An AI network on a network device (for example, the base station) side and an AI network on the UE side are trained together. In a feasible manner, when the network device (for example, the base station) is deployed, channel data is collected within a coverage area of the network device. An encoding network, the quantization network, and a decoding network are jointly trained on the network device (for example, the base station) side, to obtain one AI network. Then, the network device (for example, the base station) uses the encoding network and the quantization network as networks on the UE side, and configures the encoding network and the quantization network for UE in a service range of the network device. The network device stores the decoding network. Therefore, the network device (for example, the base station) may perform operations, for example, dequantization and decoding on information fed back by the UE, to obtain correct feedback information.

The following describes in detail the technical solutions of this application by using interaction between the network device 101 and the terminal device 102 shown in FIG. 1 as an example.

Figure 4:
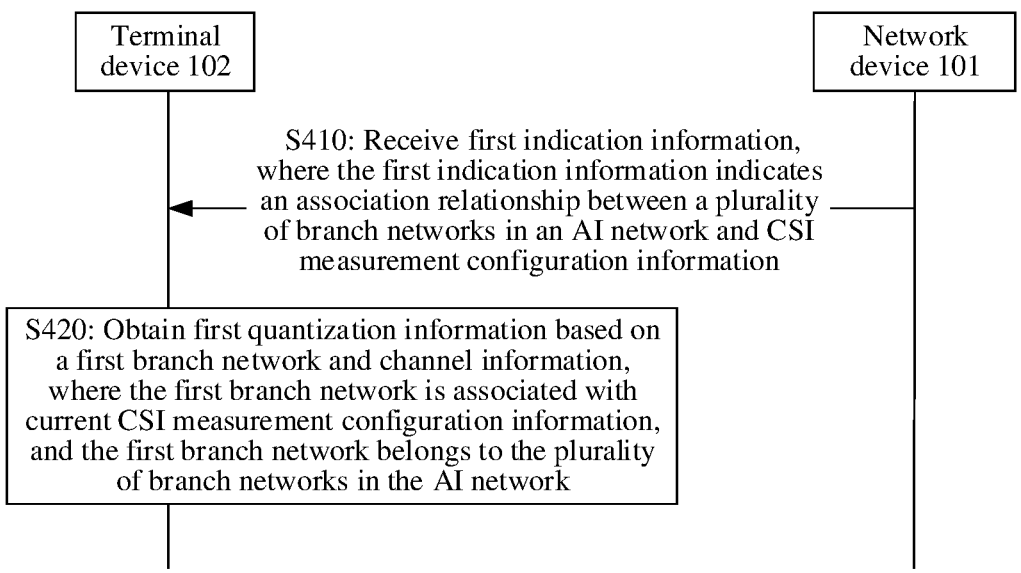
FIG. 4 is a schematic flowchart of an information transmission method according to this application.

FIG. 4 is a schematic flowchart of an information transmission method according to this application.

S410: The terminal device 102 receives first indication information from the network device 101, where the first indication information indicates an association relationship between a plurality of branch networks in an artificial intelligence AI network and channel state information CSI measurement configuration information.

The AI network may be configured by the network device 101 for the terminal device 102, or may be obtained by the terminal device 102 in a local configuration. This is not limited in this application.

S420: The terminal device 102 obtains first quantization information based on a first branch network and channel information, where the first branch network is associated with current CSI measurement configuration information, and the first branch network belongs to the plurality of branch networks in the AI network.

"Based on a first branch network and channel information" may also be expressed as processing the channel information based on the first branch network, or inputting the channel information into the first branch network. This is not limited in this application.

Optionally, the obtaining first quantization information based on a first branch network and channel information includes: obtaining a first matrix based on the first branch network and the channel information; and obtaining the first quantization information based on a first quantization network and the first matrix, where the first quantization network is associated with the current CSI measurement configuration information and/or the first branch network.

Specifically, in this application, the first indication information may indicate an association relationship between a plurality of quantization networks in the AI network and the channel state information CSI measurement configuration information, to indicate that the first quantization network is associated with the current CSI measurement configuration information and/or the first branch network.

Optionally, the first indication information further indicates a quantization manner. The quantization manner includes at least a quantization direction or a quantization dimension. The obtaining the first quantization information based on a first quantization network and the first matrix includes: processing the first matrix based on the first quantization network in the quantization manner, to obtain the first quantization information.

Optionally, the first quantization information includes second quantization information and third quantization information. The obtaining the first quantization information based on a first quantization network and the first matrix includes: dividing the first matrix into a second matrix and a third matrix in the quantization manner; and obtaining the second quantization information based on the first quantization network and the second matrix, and obtaining the third quantization information based on a second quantization network and the third matrix. The second quantization network is associated with the current CSI measurement configuration information and/or the first branch network.

Optionally, the obtaining the first quantization information based on a first quantization network and the first matrix includes: obtaining a fourth matrix based on a second branch network and the first matrix, where the second branch network is associated with the current CSI measurement configuration information, and the second branch network belongs to the plurality of branch networks in the AI network; and obtaining the first quantization information based on the fourth matrix.

Specifically, the obtaining the first quantization information based on the fourth matrix includes: obtaining the first quantization information based on a third quantization network and the fourth matrix, where the third quantization network is associated with the current CSI measurement configuration information and/or the second branch network.

Optionally, the first quantization information may further include both a quantization result of the fourth matrix and a quantization result of the first matrix.

Optionally, the method further includes: sending the first quantization information to the network device.

Specifically, the sending the first quantization information to the network device includes: sending the first quantization information to the network device in a preconfigured sequence.

The preconfigured sequence includes at least one of the following: a line before column sequence, a column before line sequence, or a sequence of identifiers IDs of the branch networks.

According to the technical solutions of this application, different measurement configurations or feedback reporting configuration requirements can be met by using a network architecture in a reuse form. This helps increase feedback information precision and reduce feedback overheads.

Figure 5:
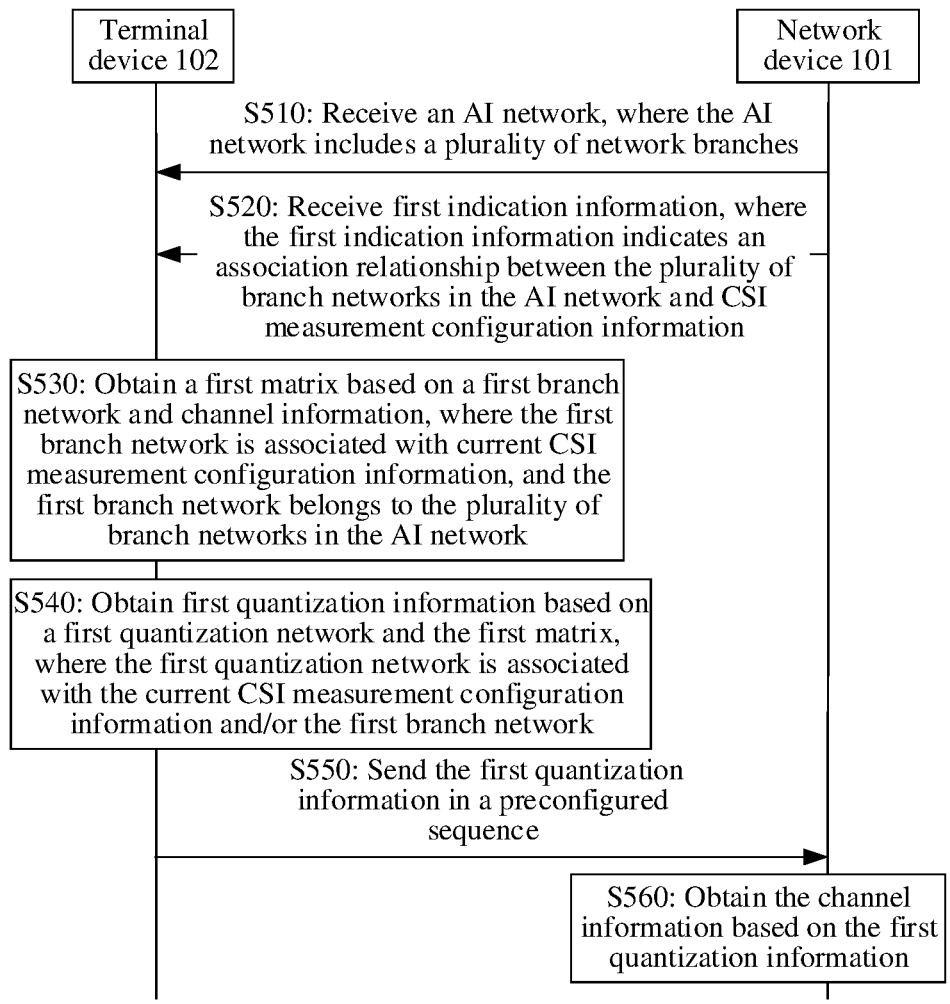
FIG. 5 is a schematic flowchart of a specific example of an information transmission method according to this application.

FIG. 5 is a schematic flowchart of a specific example of an information transmission method according to this application.

S510: The terminal device 102 receives an AI network from the network device 101, where the AI network includes a plurality of branch networks.

Specifically, after the terminal device 102 establishes communication with the network device 101, the network device may configure the AI network for the terminal device 102 via higher layer signaling. This may specifically include a network parameter and a network structure of the AI network. For example, information about the network structure may include a type of a used network layer, to be specific, the network layer belongs to a convolutional layer, a fully connected layer, and the like. The network parameter may include a quantity of neurons, a network weight between each neuron and an upper-layer neuron, and the like. Optionally, the network parameter may further include a logical identifier of the network layer or the branch network, for example, a number of the network layer or a number of the branch network.

In a possible implementation, the network device 101 may configure the network structure and parameter information by using an RRC message, for example, add a new field to an RRC information element, to indicate or describe the structure and the parameter of the entire AI network.

In another possible implementation, the network device 101 may pack the entire network structure and the parameter into one piece of large application data, and send the one piece of large application data as application layer data on a network side to UE, for example, send the one piece of large application data by using a non-access stratum (non-access stratum, NAS) message.

In this embodiment, the AI network is a network of a fully convolutional structure. An information compression part is all completed by the convolutional layer. For example, the AI network may include nine convolution layers, to separately form the branch network. For example, a specific convolution parameter may be shown in Table 1.

TABLE 1

AI encoding network parameter

| Network layer ID | Convolution kernel | Step | Padding |
| --- | --- | --- | --- |
| Convolutional layer 1 | (4, 4, 8) | (2, 2) | (1, 1) |
| Convolutional layer 2 | (4, 4, 16) | (2, 2) | (1, 1) |
| Convolutional layer 3 | (4, 4, 32) | (2, 2) | (1, 1) |
| Convolutional layer 4 | (4, 3, 32) | (2, 1) | (1, 1) |
| Convolutional layer 5 | (3, 3, 16) | (1, 1) | (1, 1) |
| Convolutional layer 6 | (1, 1, 32) | (1, 1) | (0, 0) |
| Convolutional layer 7 | (3, 3, 16) | (1, 1) | (1, 1) |
| Convolutional layer 8 | (1, 1, 32) | (1, 1) | (0, 0) |
| Convolutional layer 9 | (1, 1, 32) | (1, 1) | (0, 0) |

In this application, the AI network configured by the network device 101 further includes a quantization network (or a quantization layer) used for quantization.

For example, the network device 101 may configure a large parameter matrix, and associate different submatrix parameter combinations for different measurement resource configurations or reporting configurations, to form a plurality of submatrices. The plurality of submatrices serve as parameters of the quantization layer in the AI network to form different quantization networks.

S520: The terminal device 102 receives first indication information from the network device 101, where the first indication information indicates an association relationship between the plurality of branch networks in the AI network and CSI measurement configuration information.

The CSI measurement configuration information may be the CSI-feedback-related configuration described above, and may include a measurement resource configuration and a reporting configuration. The measurement configuration mainly refers to a configuration of a related measurement resource, for example, a quantity of antenna ports, a periodicity, and a time-frequency domain location of a CSI-RS resource. The reporting configuration refers to a CSI-reporting-related configuration, for example, reporting content (for example, PMI/RI), a reporting periodicity, and a codebook type based on which reporting is performed. It should be noted that with development of technologies, the CSI measurement configuration information may further include other CSI-feedback-related configuration information. This is not limited in this application.

Specifically, the AI network configured by the network device 101 for the terminal device may include a plurality of network branches. Different network branches are associated with different measurement resource configurations or reporting configurations in the CSI measurement configuration information. In actual application, a field may be added to a related RRC field of the measurement configuration to describe the ID of the branch network (or the network layer at which the branch network is located).

Figure 6:
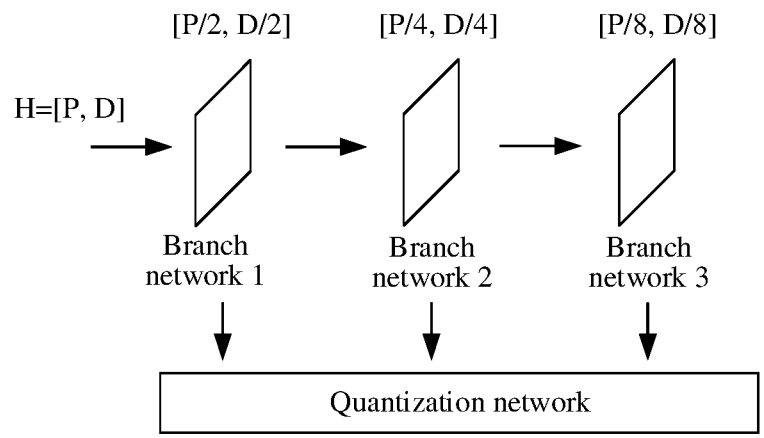
FIG. 6 is a schematic diagram of an AI network including a plurality of branch networks according to this application.

As shown in FIG. 6, H is a channel matrix that is input, P is a size of an antenna domain of a channel, and D is a size of a delay domain of a channel. For example, when the quantity of CSI-RS ports in the measurement resource configuration is 8, that is, P=8, a branch network 1 is used. In other words, after one time of convolution and down-sampling, the branch network 1 becomes a matrix whose size is [P/2, D/2], and the matrix serves as an input of the quantization layer. When the quantity of CSI-RS ports in the measurement resource configuration is 32, that is, P=32, a branch network 3 is used. After three times of convolution and down-sampling, the branch network 3 becomes a matrix whose size is [P/8, D/8], and the matrix serves as an input of the quantization layer.

For another example, when a feedback capacity in the reporting configuration is limited, it indicates that a quantity of vectors that need to be quantized is small. Therefore, the branch network 3 is used, and three times of convolution and down-sampling are performed to obtain a small matrix for quantization. When a feedback capacity in the reporting configuration is not limited, it indicates that a quantity of vectors that need to be quantized may be large. Therefore, the branch network 1 is used, and only one time of convolution and down-sampling is performed to obtain a large matrix for quantization.

S530: The terminal device 102 obtains a first matrix based on a first branch network and channel information, where the first branch network is associated with current CSI measurement configuration information, and the first branch network belongs to the plurality of branch networks in the AI network.

Specifically, the terminal device 102 may determine the first branch network based on the current CSI measurement configuration information, to process channel information obtained based on the current CSI measurement configuration information. For example, the first branch network may be the branch network 1, a branch network 2, or the branch network 3 shown in FIG. 6.

In this application, after measuring a CSI-RS, the terminal device 102 may obtain a channel response estimation value on a corresponding time-frequency resource on each antenna port according to a method, for example, minimum square estimation. Further, frequency domain information of all antenna ports at a measurement moment may be obtained, to obtain a spatial-frequency domain channel information matrix. For example, the quantity of CSI-RS antenna ports is 32, and a frequency band resource for measurement is 100 RBs. In this case, a 32*100 matrix may be obtained, indicating channel information on each antenna port on each RB.

Optionally, after obtaining the spatial-frequency domain channel information matrix, the terminal device 102 may further convert the channel information matrix, and convert the channel into an angular-delay domain channel by using DFT transform. This helps compress the channel information.

Optionally, to further discard redundant information, and with reference to a characteristic that a main channel delay distribution area is concentrated, the terminal device 102 may further crop the angular-delay domain channel in the delay domain. For example, 32 pieces of information in the delay domain are reserved in an original 32*100 channel and the original 32*100 channel is cropped into a 32*32 matrix.

The terminal device 102 may further convert the converted angular-delay domain channel into a three-dimensional real matrix, and input the three-dimensional real matrix to the determined first branch network to obtain the first matrix. For example, a 32*32 complex matrix is divided into a real part and an imaginary part to form a 32*32*2 real matrix, and the matrix is input to the first branch network (for example, the first branch network may be the branch network 3 in FIG. 6). In other words, after three convolution operations, a 16-dimensional feature is extracted, and an original [32, 32, 2] matrix is converted into a [4, 4, 16] matrix.

S540: The terminal device 102 obtains first quantization information based on the first quantization network and the first matrix, where the first quantization network is associated with the current CSI measurement configuration information and/or the first branch network.

Optionally, the network device 101 may indicate an association relationship between a plurality of quantization networks in the AI network and the channel state information CSI measurement configuration information by using the first indication information. Because the plurality of branch networks in the AI network are associated with the CSI measurement configuration information, to indicate that the first quantization network is associated with the current CSI measurement configuration information and/or the first branch network. In this case, the terminal device 102 may determine the first quantization network based on the current CSI measurement configuration information and/or the first branch network, where the first quantization network belongs to the plurality of quantization networks in the AI network. Alternatively, the network device 101 may indicate an association relationship between the plurality of quantization networks in the AI network and the channel state information CSI measurement configuration information and an association relationship between the plurality of quantization networks in the AI network and the plurality of branch networks by using the first indication information. Alternatively, the network device 101 may indicate an association relationship between the plurality of quantization networks and the plurality of branch networks in the AI network by using the first indication information.

Optionally, the network device 101 may further configure different quantization manners for different quantization networks in the CSI measurement configuration information. The quantization manner includes a quantization direction and a quantization dimension. For example, a three-dimensional input matrix may be converted into a matrix whose size is [P, D, C] through a convolution operation. In a physical meaning, P may be represented as an antenna domain, D may be represented as the delay domain, and C may be represented as a feature domain. Indicating the quantization direction refers to indicating to perform quantization by using one or more dimensions of a P dimension, a D dimension, and a C dimension. For example, in this step, the network device 101 may indicate to subsequently perform quantization on the C dimension. Indicating the quantization dimension refers to indicating a quantity of to-be-quantized dimensions in one or more dimensions, for example, indicating to subsequently perform quantization on 16 dimensions in a C dimension direction.

For example, after S530 is performed, the first matrix is [4, 4, 16]. Quantization is performed on a third-dimensional feature domain based on a previous configuration, to determine that to-be-quantized vectors are 4*416*1 vectors, which is equivalent to a 4*4 vector matrix.

Optionally, a quantization operation may be performed based on a Euclidean distance. For example, for each to-be-quantized vector, a vector with a smallest Euclidean distance is determined in one or more column vectors of the quantization network, that is, $$i=\text{argmin } \|wm-x\| \tag{1}$$

x is the to-be-quantized vector, and wm is all the column vectors in the quantization network.

Optionally, in addition to the Euclidean distance, calculation may be performed according to another distance calculation method that is pre-agreed upon or configured, for example, a Manhattan distance. This is not limited in this application.

After the quantization operation, the original vector matrix becomes a scalar matrix. In other words, the original three-dimensional matrix [4, 4, 16] may be quantized into a two-dimensional matrix [4, 4]. Each location represents quantization index information of a corresponding location vector, and may be referred to as the first quantization information in this application.

S550: The terminal device 102 sends the first quantization information to the network device 101 in a preconfigured sequence.

Specifically, the first quantization information (that is, the two-dimensional matrix) obtained through quantization may be converted into one-dimensional data in a line-priority order, to perform feedback.

Optionally, the terminal device 102 may further feed back the first quantization information to the network device in a column-priority order or in an order of IDs of branch networks or quantization networks.

Optionally, the terminal device 102 may send the first quantization information by using a same uplink resource or different uplink resources. For example, quantization information obtained by using different quantization networks is carried on a same uplink control channel (PUCCH) resource or different uplink control channel resources for sending.

S560: The network device 101 obtains the channel information based on the first quantization information.

After receiving the fed back first quantization information, the network device 101 obtains quantization index information at a corresponding location in a predefined order, and obtains a channel compression vector at a corresponding location based on a corresponding dequantization network on a network device 101 side. For example, the network device 101 receives a bit string fed back by the terminal device 105, and first obtains a two-dimensional index matrix based on an inverse operation. Then, a vector represented by each index value is obtained based on a dequantization network parameter on the network device 101 side, to obtain a two-dimensional vector matrix, that is, the first matrix. The dequantization network parameter on the network device 101 side is exactly the same as a quantization network parameter on a terminal device 102 side.

Further, the network device 101 may input the two-dimensional vector matrix, that is, the first matrix, to the branch network in the AI network on the network device 101 side, to obtain a restored angular-delay domain channel, and obtain a restored spatial-frequency domain channel by performing an IDFT operation.

The AI network on the network device 101 side and the AI network on the terminal device 102 side are jointly trained. Details are not described herein again.

According to the technical solutions of this application, different measurement configurations or feedback reporting configuration requirements can be met by using a network architecture in a reuse form. This helps increase feedback information precision and reduce feedback overheads.

Figure 7:
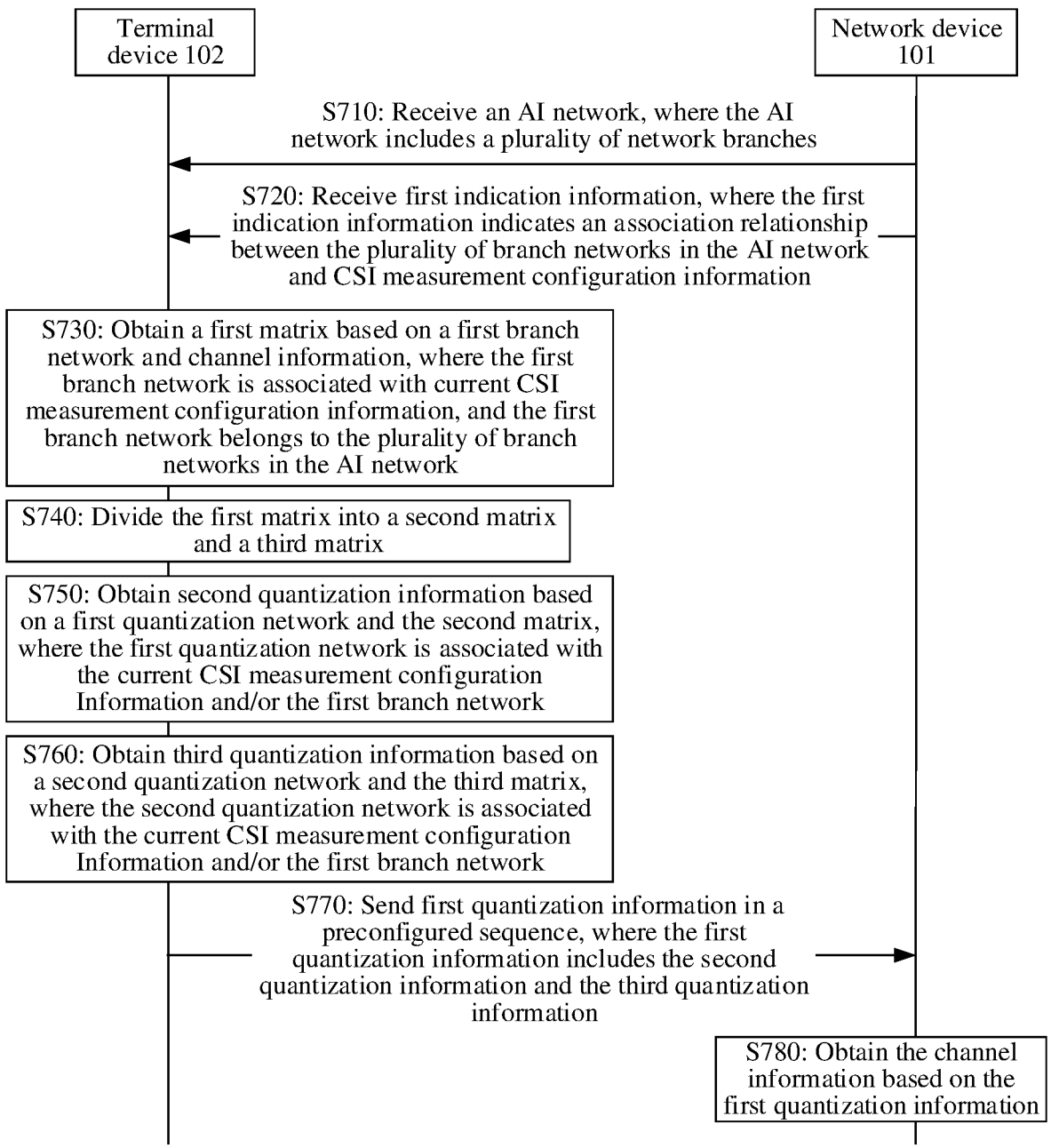
FIG. 7 is a schematic flowchart of another specific example of an information transmission method according to this application.

FIG. 7 is a schematic flowchart of another specific example of an information transmission method according to this application.

S710 to S730 are the same as S510 to S530 in FIG. 5. For brevity, details are not described herein again.

S740: The terminal device 102 divides a first matrix into a second matrix and a third matrix.

Optionally, the terminal device 102 may divide the first matrix into the second matrix and the third matrix based on a quantization manner indicated in first indication information. In actual application, S740 may be alternatively completed based on other information. This is not limited in this application.

S750 is basically the same as S540 in FIG. 5, except that the first matrix is replaced with the second matrix, that is, a part of the first matrix, and the first quantization information is not obtained completely, but second quantization information, that is, a part of the first quantization information, is obtained. Details are not described herein again.

S760: The terminal device 102 obtains third quantization information based on a second quantization network and a third matrix, where the second quantization network is associated with current CSI measurement configuration information and/or a first branch network.

Specifically, in this embodiment, the current CSI measurement configuration information and/or the first branch network may be associated with a plurality of quantization networks, so that the first matrix may be divided into a plurality of matrices, the plurality of matrices are respectively input into different quantization networks, and quantization is performed simultaneously.

For a specific quantization process, refer to the descriptions of S540 in FIG. 5. For brevity, details are not described herein again.

Figure 8:
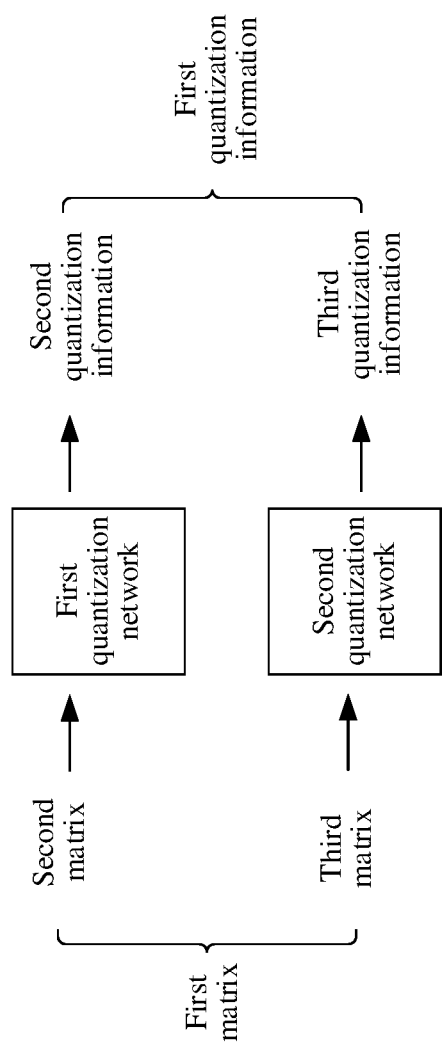
FIG. 8 is a schematic diagram of processing channel information by a plurality of quantization networks according to this application.

Optionally, in this embodiment, an AI network may further include a fully connected layer. After an encoding matrix is obtained through the first branch network, the encoding matrix may be further input to the fully connected layer to obtain the first matrix. In this case, the first matrix is a vector. Because the fully connected layer outputs the vector (where a dimension size is the same as a quantity of neurons at the fully connected layer), a dimension of the vector is usually large. For example, in network parameters of an AI encoding network in this embodiment shown in Table 2, the quantity of neurons at the fully connected layer is 128, in other words, a vector dimension output by the fully connected layer is 128. As shown in FIG. 8, the vector may be divided into two parts: a second vector (that is, the second matrix) 64 and a third vector (that is, the third matrix) 64. The second vector and the third vector are respectively input into a first quantization network and the second quantization network, to respectively obtain the second quantization information and the third quantization information.

TABLE 2

| | AI encoding network parameter | | | |
|---|---|---|---|---|
| Network layer ID | Convolution kernel | Step | Padding | Output neuron |
| Convolutional layer 1 | (3, 3, 2) | (1, 1) | (1, 1) | — |
| Fully connected layer 1 | — | — | — | 128 |

The second quantization information and the third quantization information may be combined to form the first quantization information.

It should be understood that the foregoing descriptions use an example in which the first matrix is divided into two matrices, to schematically describe the solution in this embodiment. In actual application, the first matrix may be divided into a plurality of matrices based on a real-time requirement. This is not limited in this application.

It should be further understood that when the first matrix is divided into the plurality of matrices, the first matrix may be evenly divided, or may be adaptively allocated based on a capability of the quantization network. This is not limited in this application.

S770 and S780 are the same as S550 and S560 in FIG. 5. For brevity, details are not described herein again.

According to the technical solutions of this application, different measurement configurations or feedback reporting configuration requirements can be met by using an AI network architecture in a reuse form. This helps increase feedback information precision and reduce feedback overheads. Further, the first matrix is divided into the plurality of matrices for separate quantization, so that the AI network can perform parallel processing on channel information, to increase feedback precision and an information processing speed, and reduce a communication delay.

Figure 9:
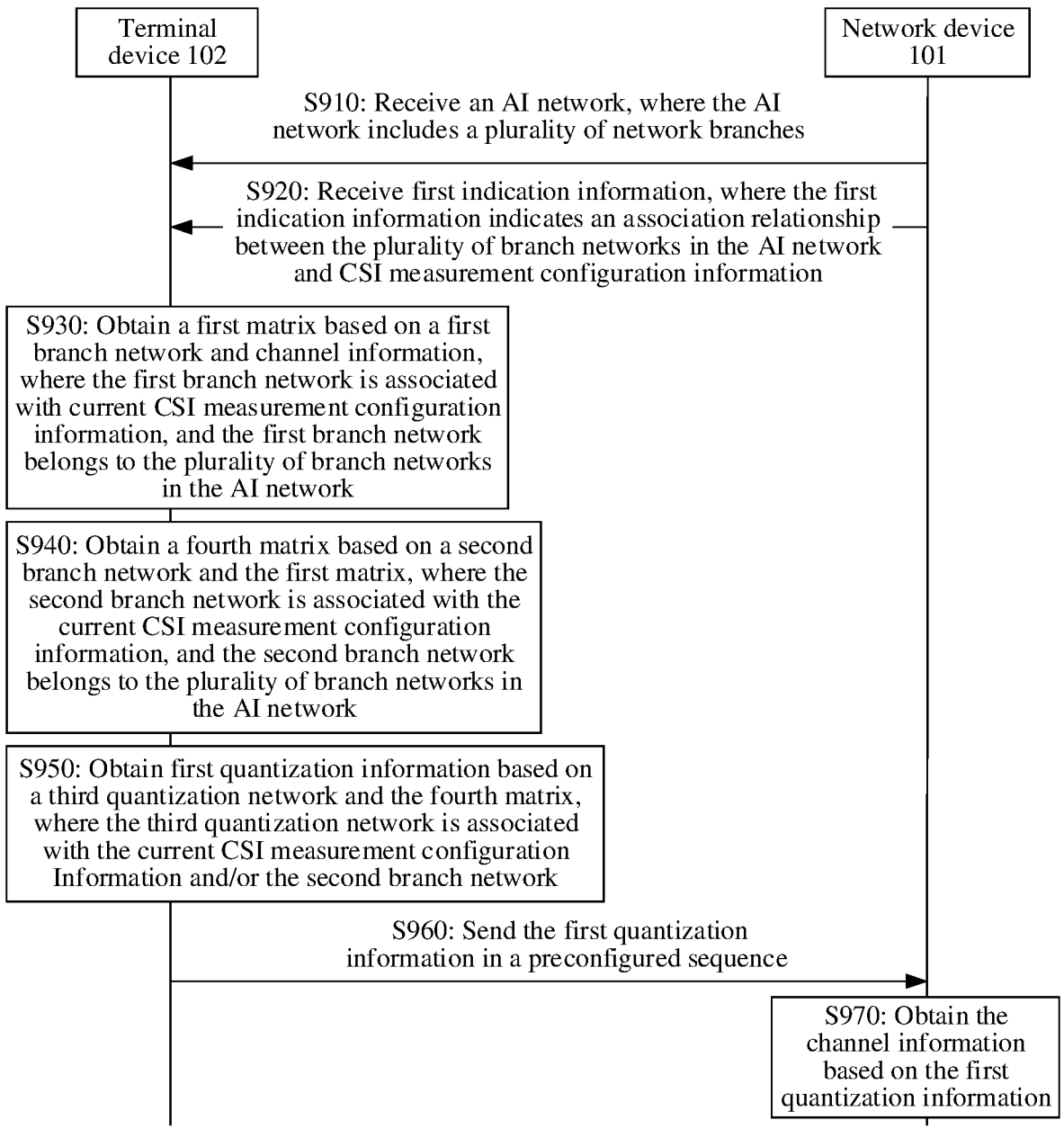
FIG. 9 is a schematic flowchart of still another specific example of an information transmission method according to this application.

FIG. 9 is a schematic flowchart of still another specific example of an information transmission method according to this application.

S910 to S930 are the same as S510 to S530 in FIG. 5. For brevity, details are not described herein again.

S940: The terminal device 102 obtains a fourth matrix based on a second branch network and a first matrix, where the second branch network is associated with the current CSI measurement configuration information, and the second branch network belongs to a plurality of branch networks in an AI network.

In this embodiment, the terminal device 102 may determine the second branch network based on the current CSI measurement configuration information, to process the first matrix. The first matrix is obtained by the terminal device 102 by processing, based on a first branch network, channel information obtained based on the current CSI measurement configuration information.

Figure 10:
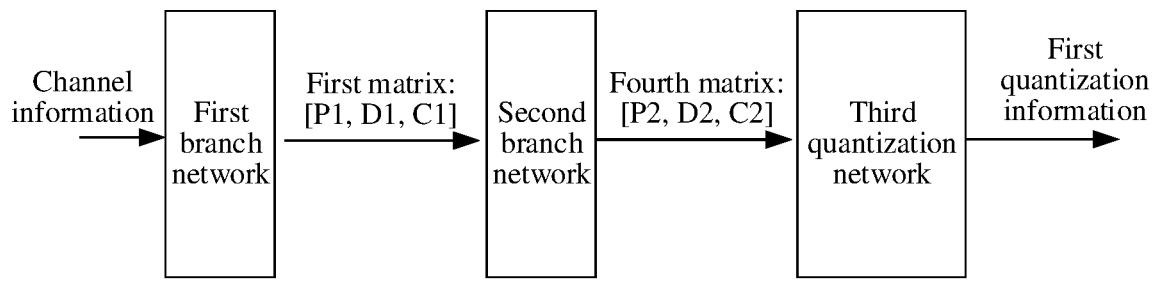
FIG. 10 is a schematic diagram of processing channel information by a plurality of branch networks according to this application.

As shown in FIG. 10, the terminal device 102 inputs the channel information into the first branch network to obtain a first matrix whose size is [P1, D1, C1] and then inputs the first matrix into the second branch network to obtain a fourth matrix whose size is [P2, D2, C2]. For a specific processing process, refer to the descriptions of S530 in FIG. 5. For brevity, details are not described herein again.

S950: The terminal device 102 obtains first quantization information based on a third quantization network and the fourth matrix, where the third quantization network is associated with the current CSI measurement configuration information and/or the second branch network.

Optionally, the network device 101 may indicate an association relationship between a plurality of quantization networks in the AI network and the channel state information CSI measurement configuration information by using first indication information, to indicate that the third quantization network is associated with the current CSI measurement configuration information and/or the second branch network. In this case, the terminal device 102 may determine the third quantization network based on the current CSI measurement configuration information and/or the second branch network, where the third quantization network belongs to the plurality of quantization networks in the AI network. The third quantization network may be the same as or different from a first quantization network.

Optionally, the first quantization information may further include both a quantization result of the fourth matrix and a quantization result of the first matrix.

A specific quantization process is similar to S540 in FIG. 5. For brevity, details are not described herein again.

It should be understood that the foregoing descriptions use an example in which the channel information is processed by using the first branch network and the second branch network, to schematically limit the solution in this embodiment. In actual application, the channel information may be processed for a plurality of times based on an actual requirement, in other words, a final to-be-quantized matrix is obtained through the plurality of branch networks, to obtain to-be-fed-back first quantization information.

It should be further understood that in this application, the plurality of branch networks in the AI network may be randomly combined to meet requirements of different CSI measurement configurations or a requirement of feedback precision. By way of example, and not limitation, the network device 101 may associate a combination relationship of the plurality of branch networks with different CSI measurement configurations.

According to the technical solutions of this application, different measurement configurations or feedback reporting configuration requirements can be met by using an AI network architecture in a reuse form. This helps increase feedback information precision and reduce feedback overheads. Further, the channel information is processed by using the plurality of branch networks. To help increase channel information feedback precision.

It should be understood that sequence numbers of the foregoing processes do not mean an execution sequence. The execution sequence of the processes should be determined based on functions and internal logic of the processes, and should not constitute any limitation on the implementation processes of embodiments of this application.

It should be further understood that in embodiments of this application, unless otherwise stated or there is a logic conflict, the terms and/or the descriptions in different embodiments are consistent and may be mutually referenced, and the technical features in different embodiments may be combined based on an internal logical relationship thereof, to form a new embodiment.

It may be understood that in the foregoing embodiments of this application, the method implemented by the communication device may also be implemented by a component (for example, a chip or a circuit) that can be configured in the communication device.

Figure 11:
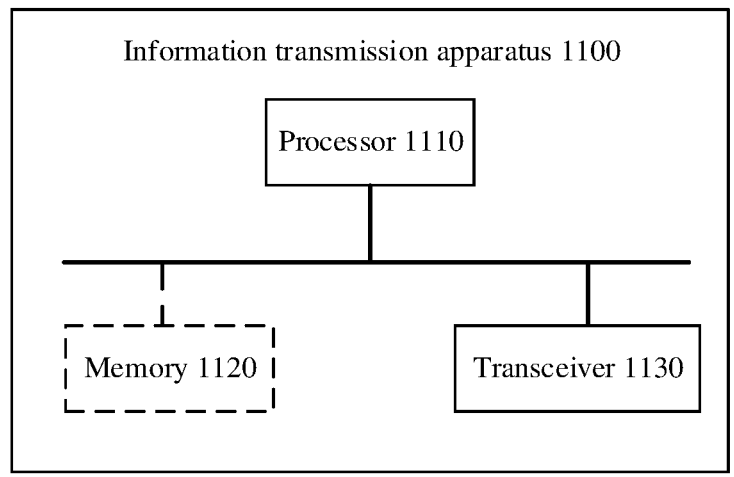
FIG. 11 is a schematic block diagram of an information transmission apparatus according to this application.
Figure 12:
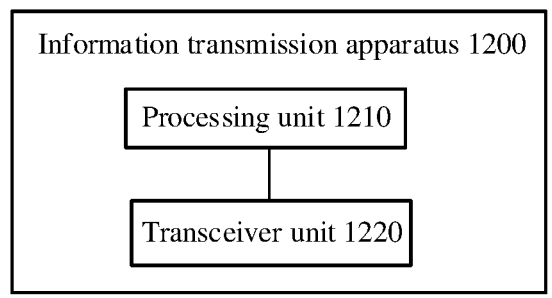
FIG. 12 is a schematic block diagram of an information transmission apparatus according to this application.

The following describes in detail an information transmission apparatus provided in embodiments of this application with reference to FIG. 11 and FIG. 12. It should be understood that descriptions of apparatus embodiments correspond to the descriptions of the method embodiments. Therefore, for content that is not described in detail, refer to the foregoing method embodiments. For brevity, some content is not described again.

In embodiments of this application, a transmit end device or a receive end device may be divided into functional modules based on the foregoing method examples. For example, each functional module may be obtained through division corresponding to each function, or two or more functions may be integrated in one processing module. The integrated module may be implemented in a form of hardware, or may be implemented in a form of a software functional module. It should be noted that in embodiments of this application, module division is an example, and is merely a logical function division. In actual implementation, another division manner may be used. The following uses an example in which each functional module is obtained through division based on each corresponding function for description.

FIG. 11 is a schematic block diagram of an information transmission apparatus 1100 according to this application. Any device, for example, the terminal device 102 and the network device 101 in any method in FIG. 4, FIG. 5, FIG. 7, and FIG. 9 may be implemented by the information transmission apparatus shown in FIG. 11.

It should be understood that the information transmission apparatus 1100 may be a physical device, a component (for example, an integrated circuit or a chip) of the physical device, or a functional module in the physical device.

As shown in FIG. 11, the information transmission apparatus 1100 includes one or more processors mo. Optionally, the processor 1110 may invoke an interface to implement receiving and sending functions. The interface may be a logical interface or a physical interface. This is not limited. For example, the interface may be a transceiver circuit, an input/output interface, or an interface circuit. The transceiver circuit, the input/output interface, or the interface circuit that is configured to implement the receiving and sending functions may be separated, or may be integrated together. The transceiver circuit or the interface circuit may be configured to read and write code/data, or the transceiver circuit or the interface circuit may be configured to communicate or transfer a signal.

Optionally, the interface may be implemented through a transceiver. Optionally, the information transmission apparatus 1100 may further include a transceiver 1130. The transceiver 1130 may also be referred to as a transceiver unit, a transceiver machine, a transceiver circuit, or the like, and is configured to implement a transceiver function.

Optionally, the information transmission apparatus 1100 may further include a memory 1120. A specific deployment location of the memory 1120 is not specifically limited in this embodiment of this application. The memory may be integrated into the processor, or may be independent of the processor. If the information transmission apparatus 1100 does not include the memory, the information transmission apparatus 1100 may have a processing function, and the memory may be deployed at another location (for example, a cloud system).

The processor 1110, the memory 1120, and the transceiver 1130 communicate with each other through an internal connection path, to transfer a control signal and/or a data signal.

It may be understood that although not shown, the information transmission apparatus 1100 may further include another apparatus, for example, an input apparatus, an output apparatus, or a battery.

Optionally, in some embodiments, the memory 1120 may store execution instructions used for performing the method in embodiments of this application. The processor 1110 may execute the instructions stored in the memory 1120 and complete, in combination with other hardware (for example, the transceiver 1130), the steps performed in the following method. For a specific working process and beneficial effects, refer to the descriptions in the foregoing method embodiments.

The methods disclosed in embodiments of this application may be applied to the processor 1110, or may be implemented by the processor 1110. The processor 1110 may be an integrated circuit chip and has a signal processing capability. In an implementation process, the steps of the method may be performed through a hardware integrated logic circuit in the processor or by using instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. It may implement or perform the methods, the steps, and the logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of a hardware module in the decoding processor and a software module. The software module may be located in a mature storage medium in the aft, for example, a random access memory (RAM), a flash memory, a read-only memory (ROM), a programmable read-only memory, an electrically erasable programmable memory, or a register. The storage medium is located in the memory, and the processor reads the instructions in the memory and completes the steps in the foregoing methods in combination with hardware of the processor.

It may be understood that the memory 1120 may be a volatile memory or a non-volatile memory, or may include both a volatile memory and a non-volatile memory. The non-volatile memory may be the read-only memory ROM, the programmable read-only memory (PROM), an erasable programmable read-only memory (EPROM), the electrically erasable programmable read-only memory (EEPROM), or the flash memory. The volatile memory may be the random access memory RAM, and serves as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the system and the method described in this specification includes but is not limited to these memories and any memory of another proper type.

FIG. 12 is a schematic block diagram of an information transmission apparatus 1200 according to this application.

Optionally, a specific form of the information transmission apparatus 1200 may be a general-purpose computer device or a chip in the general-purpose computer device. This is not limited in this embodiment of this application. As shown in FIG. 12, the information transmission apparatus includes a processing unit 1210 and a transceiver unit 1220.

Specifically, the information transmission apparatus 1200 may be any device in this application, and may implement a function that can be implemented by the device. It should be understood that the information transmission apparatus 1200 may be a physical device, a component (for example, an integrated circuit or a chip) of the physical device, or a functional module in the physical device.

In a possible design, the information transmission apparatus 1200 may be the terminal device (for example, the terminal device 102) in the foregoing method embodiments, or may be a chip configured to implement a function of the terminal device (for example, the terminal device 102) in the foregoing method embodiments.

For example, the transceiver unit is configured to receive first indication information from a network device. The first indication information indicates an association relationship between a plurality of branch networks in an artificial intelligence AI network and channel state information CSI measurement configuration information. The processing unit is configured to obtain first quantization information based on a first branch network and channel information. The first branch network is associated with current CSI measurement configuration information. The first branch network belongs to the plurality of branch networks in the AI network.

Optionally, the transceiver unit is further configured to send the first quantization information to the network device.

It should be further understood that when the information transmission apparatus 1200 is a terminal device (for example, the terminal device 102), the transceiver unit 1220 in the information transmission apparatus 1200 may be implemented by using a communication interface (for example, a transceiver or an input/output interface). The processing unit 1210 in the information transmission apparatus 1200 may be implemented by using at least one processor, for example, may correspond to the processor 1110 shown in FIG. 11.

Optionally, the information transmission apparatus 1200 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps is described in detail in the foregoing method embodiments. For brevity, details are not described herein.

In another possible design, the information transmission apparatus 1200 may be the network device (for example, the network device 101) in the foregoing method embodiments, or may be a chip configured to implement a function of the network device (for example, the network device 101) in the foregoing method embodiments.

For example, the transceiver unit is configured to send the first indication information to the terminal device. The first indication information indicates the association relationship between the plurality of branch networks in the artificial intelligence AI network and the channel state information CSI measurement configuration information. The transceiver unit is further configured to receive the first quantization information from the terminal device. The first quantization information is obtained based on the first branch network and the channel information. The first branch network is associated with the current CSI measurement configuration information. The first branch network belongs to the plurality of branch networks in the AI network.

Optionally, the transceiver unit receives the first quantization information from the terminal device in a preconfigured sequence.

It should be further understood that when the information transmission apparatus 1200 is the network device 101, the transceiver unit 1220 in the information transmission apparatus 1200 may be implemented by using the communication interface (for example, the transceiver or the input/output interface), for example, may correspond to the transceiver 1130 shown in FIG. 11. The processing unit 1210 in the information transmission apparatus 1200 may be implemented by using at least one processor, for example, may correspond to the processor 1110 shown in FIG. 11.

Optionally, the information transmission apparatus 1200 may further include the storage unit. The storage unit may be configured to store the instructions or the data. The processing unit may invoke the instructions or the data stored in the storage unit, to implement the corresponding operation.

It should be understood that the specific process in which the units perform the foregoing corresponding steps is described in detail in the foregoing method embodiments. For brevity, details are not described herein.

It should be understood that the specific process in which the units perform the foregoing corresponding steps is described in detail in the foregoing method embodiments. For brevity, details are not described herein.

In addition, in this application, the information transmission apparatus 1200 is presented in a form of the functional module. The "module" herein may be an application-specific integrated circuit ASIC, a circuit, a processor that executes one or more software or firmware programs, a memory, an integrated logic circuit, and/or another component that can provide the foregoing function. In a simple embodiment, a person skilled in the art may figure out that the apparatus 1200 may be in a form shown in FIG. 11. The processing unit 1210 may be implemented by using the processor 1110 shown in FIG. 11. Optionally, if a computer device shown in FIG. 11 includes the memory 1120, the processing unit 1210 may be implemented by using the processor 1110 and the memory 1120. The transceiver unit 1220 may be implemented by using the transceiver 1130 shown in FIG. 11. The transceiver 1130 includes a receiving function and a sending function. Specifically, the processor is implemented by executing a computer program stored in the memory. Optionally, when the apparatus 1200 is the chip, a function and/or an implementation process of the transceiver unit 1220 may be alternatively implemented by using a pin, the circuit, or the like. Optionally, the memory may be a storage unit in the chip, for example, a register or a cache. Alternatively, the storage unit may be a storage unit that is in the information transmission apparatus and that is located outside the chip, for example, the memory 1120 shown in FIG. 11, or may be a storage unit that is deployed in another system or device and that is not in the computer device.

Aspects or features of this application may be implemented as a method, an apparatus, or a product that uses standard programming and/or engineering technologies. For example, a computer-readable medium may include but is not limited to: a magnetic storage component (for example, a hard disk drive, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to various other media that can store, include and/or carry instructions and/or data.

According to the method provided in embodiments of this application, this application further provides a computer program product. The computer program product includes a computer program or a group of instructions. When the computer program or the group of instructions are run on a computer, the computer is enabled to perform the method in any one of embodiments shown in FIG. 4, FIG. 5, FIG. 7, and FIG. 9.

According to the method provided in embodiments of this application, this application further provides a computer-readable storage medium. The computer-readable medium stores a program or a group of instructions. When the program or the group of instructions are run on a computer, the computer is enabled to perform the method in any one of embodiments shown in FIG. 4, FIG. 5, FIG. 7, and FIG. 9.

According to the method provided in embodiments of this application, this application further provides a communication system. The communication system includes the foregoing apparatus or device.

Terms, for example, "component", "module", and "system" used in this specification are used for indicating computer-related entities, hardware, firmware, combinations of hardware and software, software, or software being executed. For example, the component may be, but is not limited to, a process that runs on a processor, a processor, an object, an executable file, an execution thread, a program, and/or a computer. As illustrated by using figures, both a computing device and an application that runs on the computing device may be components. One or more components may reside within the process and/or the execution thread. The component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system, a distributed system, and/or across a network, for example, the Internet interacting with other systems via the signal).

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be further understood that numbers "first", "second", and the like are introduced in embodiments of this application only to distinguish between different objects, for example, distinguish between different "information", "devices", or "units". Understanding of a specific object and a correspondence between different objects should be determined based on functions and internal logic of the specific object, and should not constitute any limitation on an implementation process of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving first indication information, wherein the first indication information indicates an association relationship between a plurality of branch networks in an artificial intelligence (AI) network and channel state information (CSI) measurement configuration information; and
   obtaining first quantization information based on a first branch network and channel information, wherein the first branch network is associated with current CSI measurement configuration information, and the first branch network belongs to the plurality of branch networks in the AI network.

2. The method according to claim 1, wherein obtaining the first quantization information based on the first branch network and the channel information comprises:
   obtaining a first matrix based on the first branch network and the channel information; and
   obtaining the first quantization information based on a first quantization network and the first matrix, wherein the first quantization network is associated with the current CSI measurement configuration information or the first branch network.

3. The method according to claim 1, wherein the first indication information further indicates a quantization manner, and the quantization manner comprises a quantization direction or a quantization dimension, and wherein obtaining the first quantization information based on a first quantization network and a first matrix comprises:
   processing the first matrix by using the first quantization network in the quantization manner, to obtain the first quantization information.

4. The method according to claim 1, wherein the first quantization information comprises second quantization information and third quantization information, and obtaining the first quantization information based on a first quantization network and a first matrix comprises:
   dividing the first matrix into a second matrix and a third matrix in a quantization manner;
   obtaining the second quantization information based on the first quantization network and the second matrix; and
   obtaining the third quantization information based on a second quantization network and the third matrix, wherein the second quantization network is associated with the current CSI measurement configuration information or the first branch network.

5. The method according to claim 1, wherein obtaining the first quantization information based on a first quantization network and a first matrix comprises:
   obtaining a fourth matrix based on a second branch network and the first matrix, wherein the second branch network is associated with the current CSI measurement configuration information, and the second branch network belongs to the plurality of branch networks in the AI network; and
   obtaining the first quantization information based on the fourth matrix.

6. The method according to claim 5, wherein obtaining the first quantization information based on the fourth matrix comprises:
   obtaining the first quantization information based on a third quantization network and the fourth matrix, wherein the third quantization network is associated with the current CSI measurement configuration information or the second branch network.

7. The method according to claim 1, wherein the method further comprises:
   sending the first quantization information.

8. The method according to claim 7, wherein sending the first quantization information comprises:
   sending the first quantization information in a preconfigured sequence.

9. The method according to claim 8, wherein the preconfigured sequence comprises:
   a line before column sequence, a column before line sequence, or a sequence of identifiers (IDs) of the branch networks.

10. A method, comprising:
    sending first indication information, wherein the first indication information indicates an association relationship between a plurality of branch networks in an artificial intelligence (AI) network and channel state information (CSI) measurement configuration information; and
    receiving first quantization information, wherein the first quantization information is obtained based on a first branch network and channel information, the first branch network is associated with current CSI measurement configuration information, and the first branch network belongs to the plurality of branch networks in the AI network.

11. The method according to claim 10, wherein the first quantization information is obtained based on a first quantization network and a first matrix, the first matrix is obtained based on the first branch network and the channel information, and the first quantization network is associated with the current CSI measurement configuration information or the first branch network.

12. The method according to claim 10, wherein the first indication information further indicates a quantization manner, and the quantization manner comprises a quantization direction or a quantization dimension, and the first quantization information is obtained based on a first quantization network, the quantization manner, and the first matrix.

13. The method according to claim 10, wherein the first quantization information comprises second quantization information and third quantization information, and the second quantization information is obtained based on a first quantization network and a second matrix, the third quantization information is obtained based on a second quantization network and a third matrix, the second matrix and the third matrix are combined to form the first matrix, and the second quantization network is associated with the current CSI measurement configuration information or the first branch network.

14. An apparatus, comprising:
a transceiver configured to receive first indication information, wherein the first indication information indicates an association relationship between a plurality of branch networks in an artificial intelligence (AI) network and channel state information (CSI) measurement configuration information;
one or more processors; and
a non-transitory computer-readable storage medium storing a program to be executed by the one or more processors, the program including instructions to:
obtain first quantization information based on a first branch network and channel information, wherein the first branch network is associated with current CSI measurement configuration information, and the first branch network belongs to the plurality of branch networks in the AI network.

15. The apparatus according to claim 14, wherein instructions to obtain the first quantization information include instructions to:
obtain a first matrix based on the first branch network and the channel information; and
obtain the first quantization information based on a first quantization network and the first matrix, wherein the first quantization network is associated with the current CSI measurement configuration information or the first branch network.

16. The apparatus according to claim 15, wherein the first indication information further indicates a quantization manner, the quantization manner comprises a quantization direction or a quantization dimension, and the instructions to obtain the first quantization information include instructions to:
process the first matrix by using the first quantization network in the quantization manner, to obtain the first quantization information.

17. The apparatus according to claim 16, wherein the first quantization information comprises second quantization information and third quantization information, and the instructions to obtain the first quantization information include instructions to:
divide the first matrix into a second matrix and a third matrix in the quantization manner; and
obtain the second quantization information based on the first quantization network and the second matrix, and obtain the third quantization information based on a second quantization network and the third matrix, wherein the second quantization network is associated with the current CSI measurement configuration information or the first branch network.

18. The apparatus according to claim 14, wherein the first quantization information is obtained based on a first quantization network and a first matrix, and the instructions to obtain the first quantization information include instructions to:
obtain a fourth matrix based on a second branch network and the first matrix, wherein the second branch network is associated with the current CSI measurement configuration information, and the second branch network belongs to the plurality of branch networks in the AI network; and
obtain the first quantization information based on the fourth matrix.

19. The apparatus according to claim 18, wherein the instructions to obtain the first quantization information include instructions to:
obtain the first quantization information based on a third quantization network and the fourth matrix, wherein the third quantization network is associated with the current CSI measurement configuration information or the second branch network.

20. The apparatus according to claim 14, wherein the transceiver is further configured to send the first quantization information.

* * * * *